(12) United States Patent
Lopez et al.

(10) Patent No.: US 11,876,390 B2
(45) Date of Patent: Jan. 16, 2024

(54) BATTERY WITH SWITCHED ACCUMULATORS

(71) Applicant: Commissariat à l'Énergie Atomique et aux Énergies Alternatives, Paris (FR)

(72) Inventors: Yan Lopez, Renage (FR); Eric Fernandez, Saint Paul de Varces (FR); Sylvain Bacquet, Chasselay (FR); Léandro Cassarino, Talence (FR); Ghislain Despesse, Voreppe (FR); Rémy Thomas, Echirolles (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 89 days.

(21) Appl. No.: 16/772,105

(22) PCT Filed: Dec. 6, 2018

(86) PCT No.: PCT/FR2018/053144
§ 371 (c)(1),
(2) Date: Jun. 11, 2020

(87) PCT Pub. No.: WO2019/115915
PCT Pub. Date: Jun. 20, 2019

(65) Prior Publication Data
US 2021/0075231 A1 Mar. 11, 2021

(30) Foreign Application Priority Data
Dec. 12, 2017 (FR) ...................................... 1761990

(51) Int. Cl.
*H02J 7/00* (2006.01)
*H02J 7/06* (2006.01)

(52) U.S. Cl.
CPC .......... *H02J 7/0024* (2013.01); *H02J 7/0029* (2013.01); *H02J 7/00714* (2020.01); *H02J 7/007182* (2020.01); *H02J 7/06* (2013.01)

(58) Field of Classification Search
CPC ............... H02J 7/0024; H02J 7/007182; H02J 7/00714; H02J 7/06; H02J 7/0063
(Continued)

(56) References Cited

U.S. PATENT DOCUMENTS

| | | | |
|---|---|---|---|
| 2005/0068005 A1 | 3/2005 | Yamashita | |
| 2013/0093396 A1* | 4/2013 | Dien | ..................... H02J 7/0013 320/118 |

(Continued)

FOREIGN PATENT DOCUMENTS

| | | |
|---|---|---|
| EP | 2 584 689 A2 | 4/2013 |
| EP | 2 681 798 B1 | 10/2018 |

OTHER PUBLICATIONS

International Search Report and Written Opinion for International Application No. PCT/FR2018/053144, dated Mar. 15, 2019.

(Continued)

*Primary Examiner* — Yalkew Fantu
(74) *Attorney, Agent, or Firm* — Wolf, Greenfield & Sacks, P.C.

(57) ABSTRACT

A battery with switched accumulators, including: a first cell; a plurality of second cells series-connected with the first cell, each first and second cell including: an electric accumulator series-connected with a first switch, a second switch connected in parallel with the accumulator and the first switch, and a first diode, the cathodes of the first diodes being connected to an output node, the anode of the accumulator of the first cell being connected to ground, the anode of the first diode of each second cell being coupled to the cathode of the accumulator by at least one third switch; and a control circuit capable of measuring characteristics of at least certain accumulators and of controlling the first, second, and third switches according to the characteristics.

15 Claims, 5 Drawing Sheets

(58) Field of Classification Search
USPC .......................................................... 320/117
See application file for complete search history.

(56) References Cited

U.S. PATENT DOCUMENTS

| | | | | |
|---|---|---|---|---|
| 2013/0320772 | A1* | 12/2013 | Qiao ..................... | H02J 7/0025 307/85 |
| 2014/0015488 | A1* | 1/2014 | Despesse ................ | H02J 7/007 429/7 |
| 2014/0266049 | A1* | 9/2014 | Benckenstein, Jr. . | H02J 7/0031 320/112 |
| 2014/0307358 | A1* | 10/2014 | Duan ..................... | H02H 3/087 361/93.1 |
| 2015/0145481 | A1* | 5/2015 | Yamauchi ............. | B60L 3/0046 320/117 |
| 2015/0180235 | A1* | 6/2015 | Gray ................. | H02J 13/00009 307/31 |
| 2017/0256982 | A1* | 9/2017 | Kumar K N ........... | H02J 1/108 |
| 2018/0159317 | A1* | 6/2018 | Mirabella .......... | H03K 19/0027 |

OTHER PUBLICATIONS

International Preliminary Report on Patentability for International Application No. PCT/FR2018/053144, dated Jun. 16, 2020.

* cited by examiner

BATTERY WITH SWITCHED ACCUMULATORS

This application is a national stage filing under 35 U.S.C. § 371 of International Patent Application Serial No. PCT/FR2018/053144, filed Dec. 6, 2018, which claims priority to French patent application FR17/61990. The contents of these applications are incorporated herein by reference in their entirety.

BACKGROUND

The present disclosure relates to the field of batteries with switched accumulators.

DISCUSSION OF THE RELATED ART

A battery with switched accumulators is a battery comprising a plurality of generally identical modules connected in series and/or in parallel, having their number depending on the desired voltage across the battery. Each module comprises a plurality of electric accumulators. Switches connected in series and in parallel with the accumulators enable to couple or not in series each accumulator between the output nodes of the module, to select the output voltage among the different combinations of the voltages supplied by the accumulators.

Each battery module comprises a switch control circuit. The control circuit is capable of selecting the accumulators to be coupled between the output nodes according to various criteria, for example, the desired output voltage or the charge level of each accumulator.

The control circuit is powered by a power supply voltage which is preferably referenced to the module ground. The control circuit is thus generally powered by an accumulator of the module connected to ground.

A disadvantage of such a battery is that if the accumulator supplying the control circuit is discharged or if it undergoes a failure causing a significant drop in the voltage that it supplies, the control circuit is no longer powered and the accumulators can no longer be switched.

SUMMARY

Thus, an object of an embodiment is to at least partly overcome the disadvantages of the previously-described batteries with switched accumulators.

Thus, an embodiment provides a battery with switched accumulators comprising: a first unit; a plurality of second units series-connected with the first unit, each first and second unit comprising: an electric accumulator series-connected, by the cathode, with a first switch, a second switch connected in parallel with the accumulator and the first switch, and a first diode, the anode of the first diode being coupled to the cathode of the accumulator, the cathodes of the first diodes being connected to an output node, the anode of the accumulator of the first unit being connected to ground, the anode of the first diode of each second unit being coupled to the cathode of the accumulator by at least one third switch; and a control circuit capable of measuring characteristics of at least certain accumulators and of controlling the first, second, and third switches according to the characteristics.

According to an embodiment, the cathode of the accumulator of each second unit is coupled to the anode of the first diode of the second considered unit by as many third switches as there are first and second units located between the second considered unit and the ground.

According to an embodiment, the cathode of the accumulator of the first unit is coupled to the anode of the first corresponding diode via a fourth switch.

According to an embodiment, each of the third switches has the same state, on or off, as one of the second switches.

According to an embodiment, the states of the third switches are independent from the states of the first and second switches.

According to an embodiment, the state of the first switch and the state of the second switch of each first or second unit are opposite.

According to an embodiment, the anode of the accumulator of each second unit is connected to the cathode of a second diode, the anode of said second diode being coupled to ground by a resistor.

According to another embodiment, a method of use of a battery such as previously described comprises the steps of: detecting the failure of an accumulator of a unit among the first unit or one of the second units; turning on the second switch of said unit and turning off the first switch of said unit; and turning on at least one third switch of another unit among the first unit or one of the second units.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
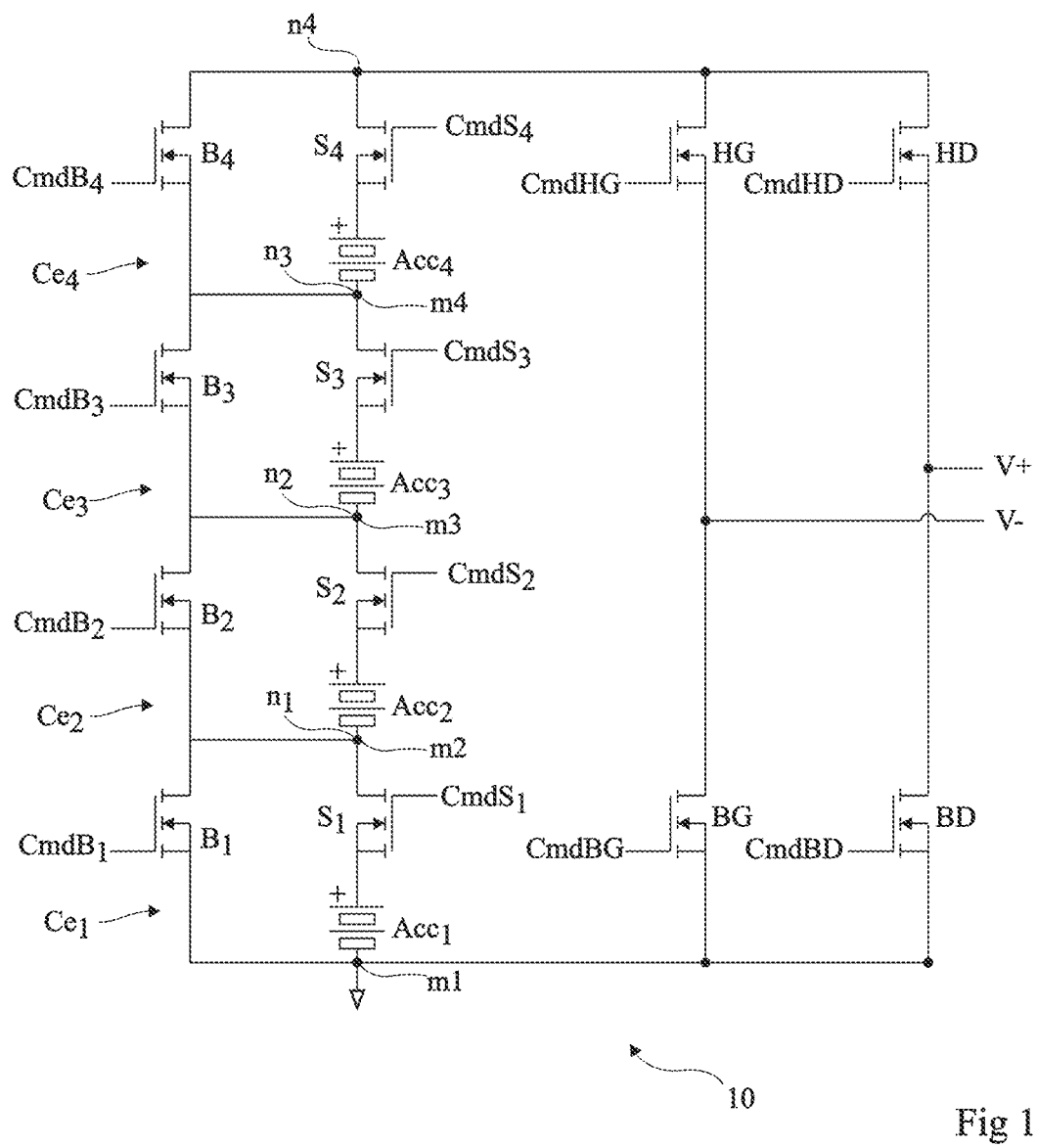
FIG. 1 schematically shows a module of a battery with switched accumulators.

The same elements have been designated with the same reference numerals in the various drawings and, further, the various drawings are not to scale. For the sake of clarity, only the elements that are useful for an understanding of the embodiments described herein have been illustrated and described in detail. In particular, the circuits for controlling the battery modules are not shown and their operation is not described.

In the following description, when reference is made to terms qualifying the relative position, such as term "left-hand", "right-hand", etc., reference is made to the orientation of the concerned elements in the drawings.

Unless otherwise specified, the term "substantially" means within 10%, preferably within 5%, of the value in question.

Unless otherwise specified, when reference is made to two elements connected together, this means that the two elements are directly connected with no intermediate element other than conductors, and when reference is made to two elements coupled together, this means that the two elements may be directly coupled (connected) or coupled via one or a plurality of other elements.

When reference is made to the state of a switch or of a transistor, it is spoken of the on state or of the off state. When reference is made to the voltage of a point or of a node, it is considered that it is the voltage between the point or node and the ground.

An embodiment of a method of controlling systems with switched cells will be described in the case of a battery with switched accumulators for which the cells correspond to switched accumulators. However, the present embodiments apply to any type of system with switched cells capable of supplying a variable voltage to a load. Each cell of the system with switched cells may correspond to an electric charge storage element or to an electric generator. An example of an electric charge storage element for example is an electric accumulator or a capacitor. An example of an electric generator is for example a fuel cell, a zinc-air cell, a photovoltaic cell, or a power recovery system, particularly a small wind power generator or a mini-turbine. The system witch switched cells may comprise electric charge storage elements only, electric generators only, or both electric charge storage elements and electric generators. When the system with switched cells comprises electric generators only, the use is theoretically is discharge mode only. However, in case of a reactive power, for brief passages through a negative power at each period, the inertia of the generator may be sufficient to smooth the power, for example, due to the rotation inertia and to the stray capacitances. Further, each generator may be connected in parallel with a resistive element, to accept negative powers, by dissipating this energy. In operation, the system is intended to be coupled to a device which absorbs or supplies power according to the envisaged application. As an example, this device corresponds to an electric machine, for example, to an electric motor, or to the electric distribution network.

FIG. 1 schematically shows a module 10 of a battery with switched accumulators. Generally, each module of such a battery comprises N units $Ce_i$, N being an integer and i varying from 1 to N. In the example of FIG. 1, N is equal to 4.

Each unit $Ce_i$ comprises nodes $m_i$ and $n_i$. The node $n_i$ of unit $Ce_i$ is connected to the node $m_i$ of unit $Ce_{i+1}$, for i varying from 1 to N-1. The node $m_1$ of unit $Ce_1$ is connected to ground. Each unit $Ce_i$ comprises an accumulator $Acc_i$ series-connected by the cathode with a transistor $S_i$ between nodes $m_i$ and $n_i$, the anode of accumulator $Ce_i$ being connected to node $m_i$. The anode of accumulator $Acc_1$ is thus connected to node $m_i$ and to ground. Each unit also comprises a transistor $B_i$ connected between nodes $m_i$ and $n_i$, in parallel with the assembly comprising accumulator $Acc_i$ and transistor $S_i$. Transistors $S_i$ and $B_i$ have the function of switches and are respectively controlled by control signals $CmdS_i$ and $CmdB_i$. In the present embodiment, transistors Si and Bi are N-channel MOS transistors.

Node $n_N$, here $n_4$, is coupled to an output node V− of module 10 by a transistor HG, controlled by a control signal CmdHG. Node $n_N$ is coupled to an output node V+ of module 10 by a transistor HD, controlled by a control signal CmdHD. Node $m_1$ is coupled to the output node V− of module 10 by a transistor BG, controlled by a control signal CmdBG. Node $m_1$ is coupled to the output node V+ of module 10 by a transistor BD, controlled by a control signal CmdBD. In the present embodiment, transistors HD, HG, BD, and BG are N-channel MOS transistors.

The control signals are supplied by a control circuit, not shown. The control unit may correspond to a dedicated circuit and/or may comprise a processor, for example, a microprocessor or a microcontroller, capable of executing instructions of a computer program stored in a memory. For unit $Ce_i$, with i varying from 1 to N, control signals $CmdS_i$ and $CmdB_i$ are such that when transistor $S_i$ is on, transistor $B_i$ is off and conversely. Thus, the voltage between node $m_i$ and node $n_i$ is either zero, if $B_1$ is on, or substantially equal to the voltage supplied by accumulator $Acc_i$ if transistor $S_i$ is on. The voltage between nodes $m_1$ and $n_N$ is thus substantially equal to a combination of the voltages supplied by the different accumulators $Acc_i$ of units $Ce_i$.

The control signals of transistors HG, HD, BG, and BD are supplied by the control circuit. Transistors HG, HD, BG, BD may have various configurations, among which two main ones. In a first main configuration, transistors HD and BG are on and transistors HG and BD are off. Thus, the voltage at output node V+ is substantially equal to the voltage of node $n_N$ and the voltage at output node V− is substantially equal to the voltage of node $m_1$. In a second main configuration, transistors HD and BG are off and transistors HG and BD are on. Thus, the voltage at output node V− is substantially equal to the voltage of node $n_N$ and the voltage at output node V+ is substantially equal to the voltage of node $m_1$. The two configurations supply opposite voltages between nodes V+ and V−.

Module 10 further comprises sensors, not shown, capable of measuring at least one characteristic of at least some of the accumulators, preferably of each accumulator, for example, the voltage supplied by the accumulator, its current or its temperature, and of supplying the measurements to the control circuit.

In operation, if the failure of one of accumulators $Acc_i$ is detected, the control circuit can modify the states of transistors $S_i$ and $B_i$ so that accumulator $Acc_i$ is no longer used or that it is only used in some ways. For example, a discharged accumulator might only be used for a charge operation.

The control circuit is for example supplied by one of the accumulators of the module. The power supply voltage of the control circuit being preferably referenced to ground, the power supply of the control circuit may be provided by accumulator $Acc_1$.

If accumulator $Acc_1$ undergoes a failure causing a significant drop in the voltage supplied to the control circuit, the control circuit can then no longer be supplied.

Figure 2:
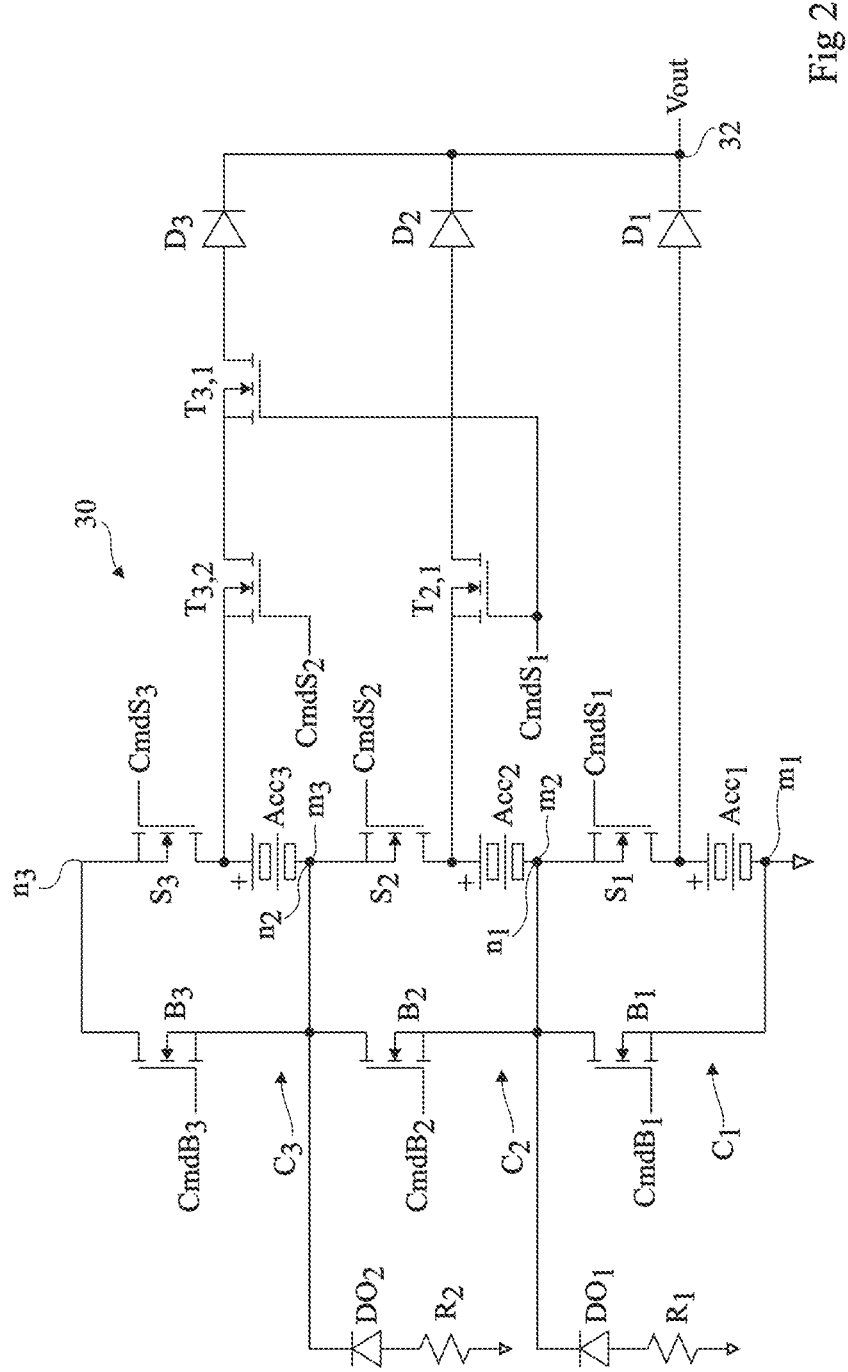
FIG. 2 schematically and partially shows an embodiment of a module of a battery witch switched accumulators.
Figure 3:
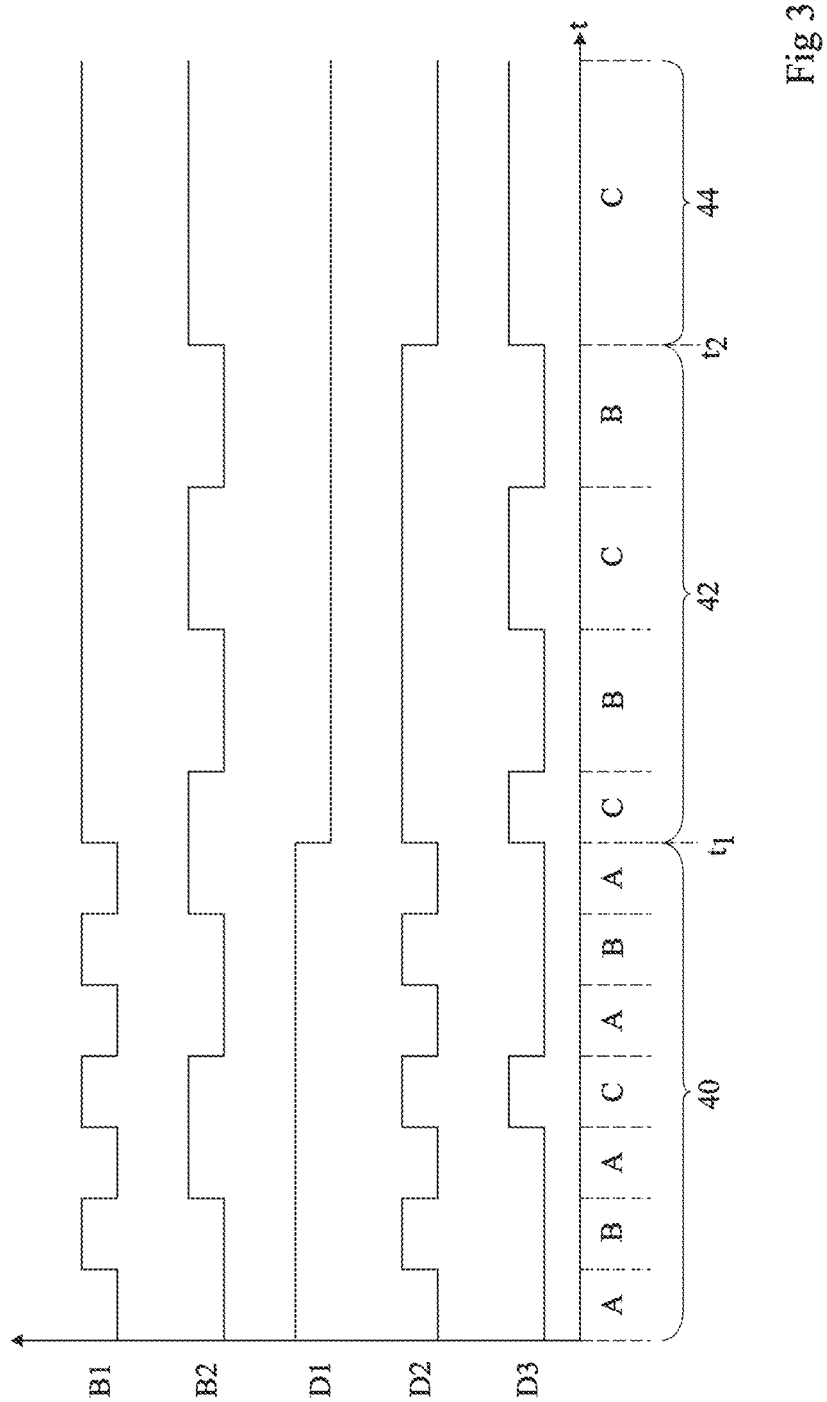
FIG. 3 is a timing diagram illustrating the operation of the battery module according to the embodiment of FIG. 2.

FIG. 2 schematically and partially shows an embodiment of a module 30 of a battery with switched accumulators. FIG. 3 shows a timing diagram illustrating the operation of the battery module according to the embodiment of FIG. 2.

Generally, the module comprises N units $C_i$, N being an integer and i varying from 1 to N. In FIG. 2, N is equal to 3. Each unit $C_i$ comprises the elements of the units $Ce_i$ of FIG. 1, that is, an accumulator $Acc_i$ and transistors $B_i$ and $S_i$ connected as previously described between nodes $m_i$ and $n_i$. As previously, node $m_1$ is connected to ground and nodes $m_i$ and $n_N$, here $n_3$, are coupled to output nodes V+ and V− by transistors HD, HG, BD, and BG which are not shown in FIG. 2. The operation of the switched accumulators is similar to the operation described in relation with FIG. 1.

Each unit $C_i$, with i varying from 1 to N, further comprises a diode $D_i$. The cathode of accumulator $Acc_i$ is coupled to the anode of diode $D_i$. The cathode of diode $D_i$ is connected to a node 32. Call Vout the voltage of node 32. Voltage Vout powers the control circuit, not shown.

The cathode of each accumulator $Acc_i$, with i varying from 2 to N, is coupled to the anode of diode $D_i$ by i−1 transistors $T_{i,j}$ in series controlled by control signals $CmdS_j$, with j varying from 1 to i−1. For example, in FIG. 2, the cathode of accumulator $Acc_3$ is coupled to the anode of diode $D_3$ by a transistor $T_{3,2}$ controlled by control signal $CmdS_2$ and a transistor $T_{3,1}$ controlled by control signal $CmdS_1$. Transistors $T_{i,j}$ have the function of switches. In the present embodiment, transistors $T_{i,j}$ are P-channel MOS transistors.

Thus, for a given unit $C_i$, all the switches $T_{i,j}$, with j varying from 1 to i−1, connected between the cathode of accumulator $Acc_i$ and diode $D_i$ are on when all switches $T_{v,w}$, with v varying from 1 to i−1 and w varying from 1 to v−1, are on.

Diodes $D_i$ form a block implementing logic function OR. Thus, voltage Vout at node 32, forming the block output, is substantially equal to the highest voltage among the voltages at the level of the anodes of diodes $D_i$, forming the block inputs.

The control signals are selected so that, for a given unit $C_j$, when transistor $S_j$ is in a first state, off or on, transistor $B_j$ and transistors $T_{i,j}$, i being capable of varying from j+1 to N, are in a second state, on or off.

FIG. 3 shows an example of the time variation of the state of transistors $B_1$ and $B_2$ and of the state of diodes $D_1$, $D_2$ and $D_3$. The state of transistors $B_1$ or $B_2$ is shown by a signal at a high level when the transistor is on and by a signal at a low level when the transistor is off. The state of diode $D_1$, $D_2$, or $D_3$ is shown by a high level when the voltage at the anode of the diode is the voltage supplied by the associated accumulator and it can be used to power to the control circuit. The state of diode $D_1$, $D_2$, or $D_3$ is represented by a low level when the voltage at the anode of the diode cannot be used to power the control circuit, for example because at least one of the switches between the anode of the diode and the cathode of the associated accumulator is not on or because the associated accumulator has undergone a failure.

The states of transistors $S_1$, $S_2$, $T_{2,1}$, $T_{3,1}$ and $T_{3,2}$ are not shown and can be deduced from the state of transistors $B_1$ and $B_2$. As previously described, transistors $S_1$, $S_2$, and $S_3$ are controlled to be respectively in the state opposite to the state of transistors $B_1$, $B_2$, and $B_3$. Transistors $T_{2,1}$ and $T_{3,1}$ are controlled to be in the same state as transistor $B_1$. Transistor $T_{3,2}$ is controlled to be in the same state as transistor $B_2$. The states of the transistors of unit $C_N$, here the transistors $B_3$ and $S_3$ of unit $C_3$, have no influence on the power supply of the control circuit.

The timing diagram is divided in three portions 40, 42, and 44. Portion 40, on the left-hand side, corresponds to a normal operation of battery module 30. Portion 42, at the center, starts at a time $t_1$ and corresponds to the operation during a failure of accumulator $Acc_1$. Portion 44, on the right-hand side, starts at a time $t_2$ and corresponds to the operation during a failure of accumulator $Acc_2$ following the failure of accumulator $Acc_1$.

In normal operation, the voltage at the anode of diode $D_1$, that is, the voltage at an input of the block implementing logic function OR, is constant and substantially equal to the voltage supplied by accumulator $Acc_1$, whatever the state of transistors $B_1$ and $B_2$. Thus, the state of diode $D_1$ is represented by a high level in normal operation. The voltage at the anode of diode $D_2$, that is, the voltage at another input of the block implementing logic function OR, is substantially equal to the voltage supplied by accumulator $Acc_2$ when transistor $B_1$ is on, which enables to reference accumulator $Acc_2$ to ground. The state of diode $D_2$ is thus shown at the high level when transistor $B_1$ is on. When transistor $B_1$ is off, the voltage at the anode of diode $D_2$ is no longer the voltage supplied by the accumulator and the state of diode $D_2$ is shown as a low level. The voltage at the anode of diode $D_3$, that is, the voltage at another input of the block implementing logic function OR, is substantially equal to the voltage supplied by accumulator $Acc_3$ when transistors $B_1$ and $B_2$ are both on. The state of diode $D_3$ is then shown at the high level. When at least one of transistors $B_1$ and $B_2$ is off, the voltage at the anode of diode $D_3$ is no longer the voltage supplied by accumulator $Acc_3$ and the state of diode $D_3$ is represented by a low level.

Voltage Vout corresponds to the voltage at the output of the block implementing logic function OR and is thus substantially equal to the maximum voltage among the voltages at the anodes of diodes $D_1$, $D_2$, or $D_3$.

More generally, the voltage at the anode of a diode $D_i$ associated with a unit $C_i$ is substantially equal to the voltage supplied by the accumulator $Acc_i$ of the same unit when all transistors $B_j$, with j varying from 1 to i−1, are on.

Thus, in normal operation, voltage Vout may have three different values:

voltage Vout is substantially equal to the voltage supplied by accumulator $Acc_1$, when transistor $B_1$ is off, which corresponds to periods A of the timing diagram;

voltage Vout is substantially equal to the maximum value between the voltage supplied by accumulator $Acc_1$ and that supplied by accumulator $Acc_2$, when transistor $B_1$ is on and when transistor $B_2$ is off, which corresponds to periods B of the timing diagram; or voltage Vout is substantially equal to the maximum value between the voltages supplied by accumulators $Acc_1$, $Acc_2$ and $Acc_3$, when transistors $B_1$ and $B_2$ are on, which corresponds to periods C of the timing diagram.

At time $t_1$, accumulator $Acc_1$ starts failing. This is shown as a switching to the low level of the state of diode $D_1$. Such a failure is detected by the control circuit due to the sensors, not shown in FIG. 2. As a response to the failure, the control circuit modifies the control signal to turn on transistors $B_1$, $T_{2,1}$, and $T_{3,1}$ and to turn off transistor $S_1$. Thus, the anode of accumulator $Acc_2$ is referenced to ground and the voltage at the anode of diode $D_2$ is substantially equal to the voltage supplied by accumulator $Acc_2$.

Transistor $B_1$ being on, portion 42 only comprises periods B and C. Since the voltage at the anode of diode $D_1$ cannot supply the control circuit after time $t_1$, for example due to too significant a decrease in the voltage supplied by the accumulator, it is considered that the voltage at the anode of diode $D_1$ is smaller than the voltages at the anodes of diodes $D_2$ and $D_3$. During periods B, voltage Vout thus has the value of the voltage supplied by accumulator $Acc_2$ and during periods C, voltage Vout has the maximum value between the values of the voltages supplied by accumulators $Acc_2$ and $Acc_3$.

At time $t_2$, accumulator $Acc_2$ starts failing. This is shown by a switching to the low level of the state of diode $D_2$. The failure is detected by the control circuit due to the sensors. As a response to the failure, the control circuit modifies the control signals to turn on transistors $B_2$ and $T_{3,2}$ and to turn off transistor $S_2$. Thus, the anode of accumulator $Acc_3$ is referenced to ground and the voltage at the anode of diode $D_3$ is substantially equal to the voltage supplied by accumulator $Acc_3$.

Transistors $B_1$ and $B_2$ being on, portion 44 corresponds to a period C during which voltage Vout has the maximum value between the voltages supplied by accumulators $Acc_1$, $Acc_2$, and $Acc_3$. Since accumulators $Acc_1$ and $Acc_2$ have failed, the control circuit is powered by accumulator $Acc_3$.

Advantageously, as long as one of the accumulators has not failed, the control circuit is powered.

The units $C_i$, with i varying from 1 to N−1, of FIG. 2 further comprise a diode $D0_i$, having its cathode coupled to node $n_i$ and having its anode coupled to ground via a resistor $R_i$. Resistances $R_i$ are relatively low, for example, in the range from 1 to 10 ohms. These components enable to improve the referencing of accumulators $Acc_i$ to ground during periods when transistors $B_i$ and $S_i$ are not driven. These components may be omitted. An advantage of the embodiment of FIG. 2 is that it uses the same control signals for the control of transistors $T_{i,j}$ as those already used for the switching of the accumulators. Indeed, due to the circuit structure, values of control signals $CmdS_i$ are within ranges adapted to simultaneously turn on transistor $S_i$ and turn off transistors $T_{j,i}$ with j greater than i, and conversely. The design of the control circuit is thus simplified.

Figure 4:
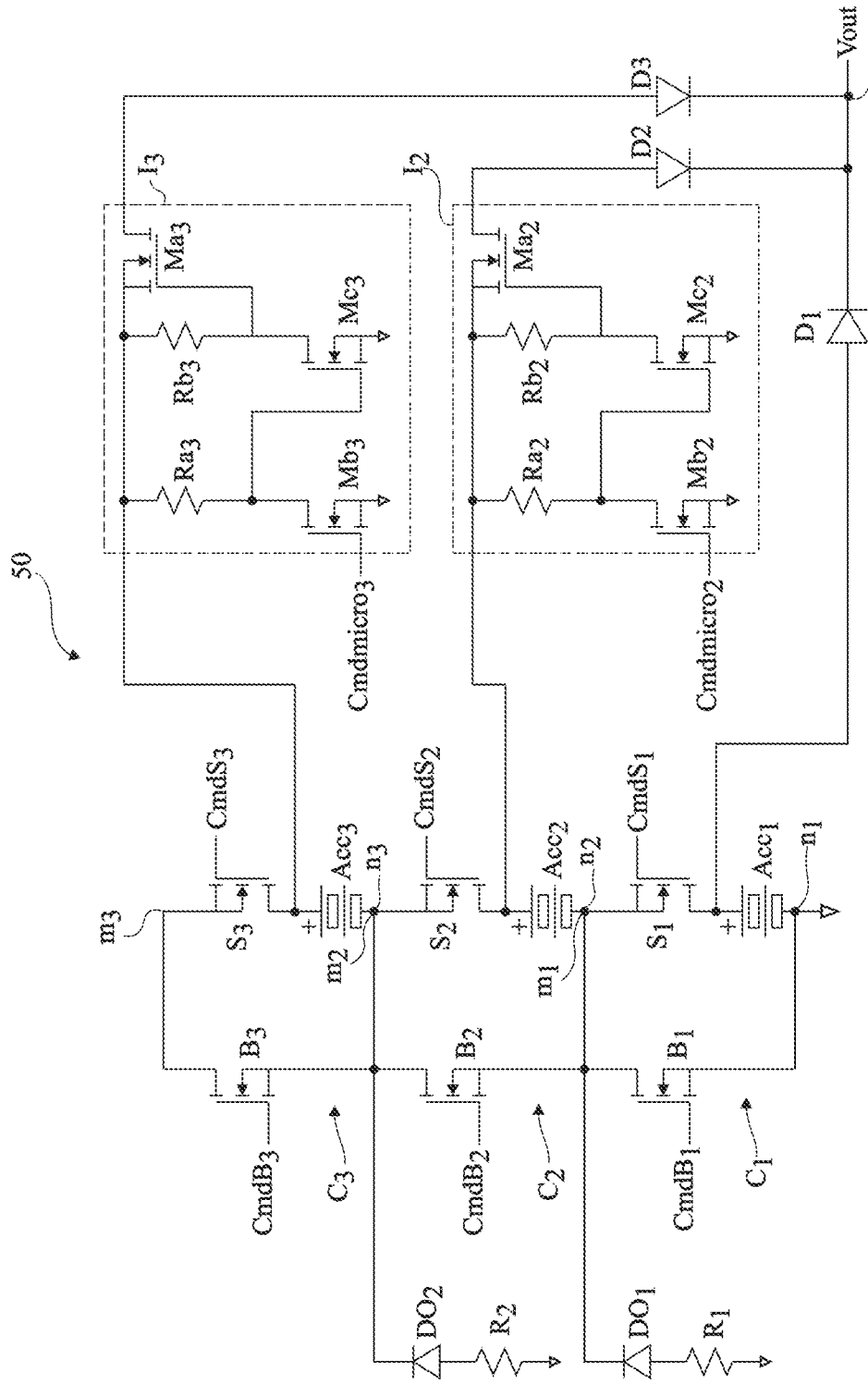
FIGS. 4 and 5 schematically and partially show other embodiments of a module of a battery with switched accumulators.

FIG. 4 schematically and partially shows another embodiment of a module 50 of a battery with switched accumulators comprising N units $C_i$. In FIG. 4, N is equal to 3. FIG. 4 comprises all the elements shown in FIG. 2, with the difference that for a given unit $C_i$, transistors $T_{i,j}$, with j varying from 1 to j−1, are replaced with a switch $I_i$ controlled by a control signal $Cmdmicro_i$.

Control signals $Cmdmicro_i$ are supplied by the control circuit, not shown, and may be selected independently from the control signals of transistors $B_i$ and $S_i$. During a failure of accumulator $Acc_i$, it is thus possible to choose to power the control circuit with any of the other accumulators $Acc_j$, with i varying from 2 to N.

Each switch 4, with i varying from 2 to N, comprises in FIG. 4 a transistor $Ma_i$ connected between the cathode of accumulator $Acc_i$ and the anode of diode $D_i$. The cathode of accumulator $Acc_i$ is, further, coupled to ground by a resistor $Ra_i$ in series with a transistor $Mb_i$ controlled by control signal $Cmdmicro_i$. The cathode of accumulator $Acc_i$ is also coupled to ground by a resistor $Rb_i$ in series with a transistor $Mc_i$ controlled by the node of connection between resistor $Ra_i$ and transistor $Mb_i$. Transistor $Ma_i$ is controlled by the connection node between resistor $Rb_i$ and transistor $Mc_i$.

Figure 5:
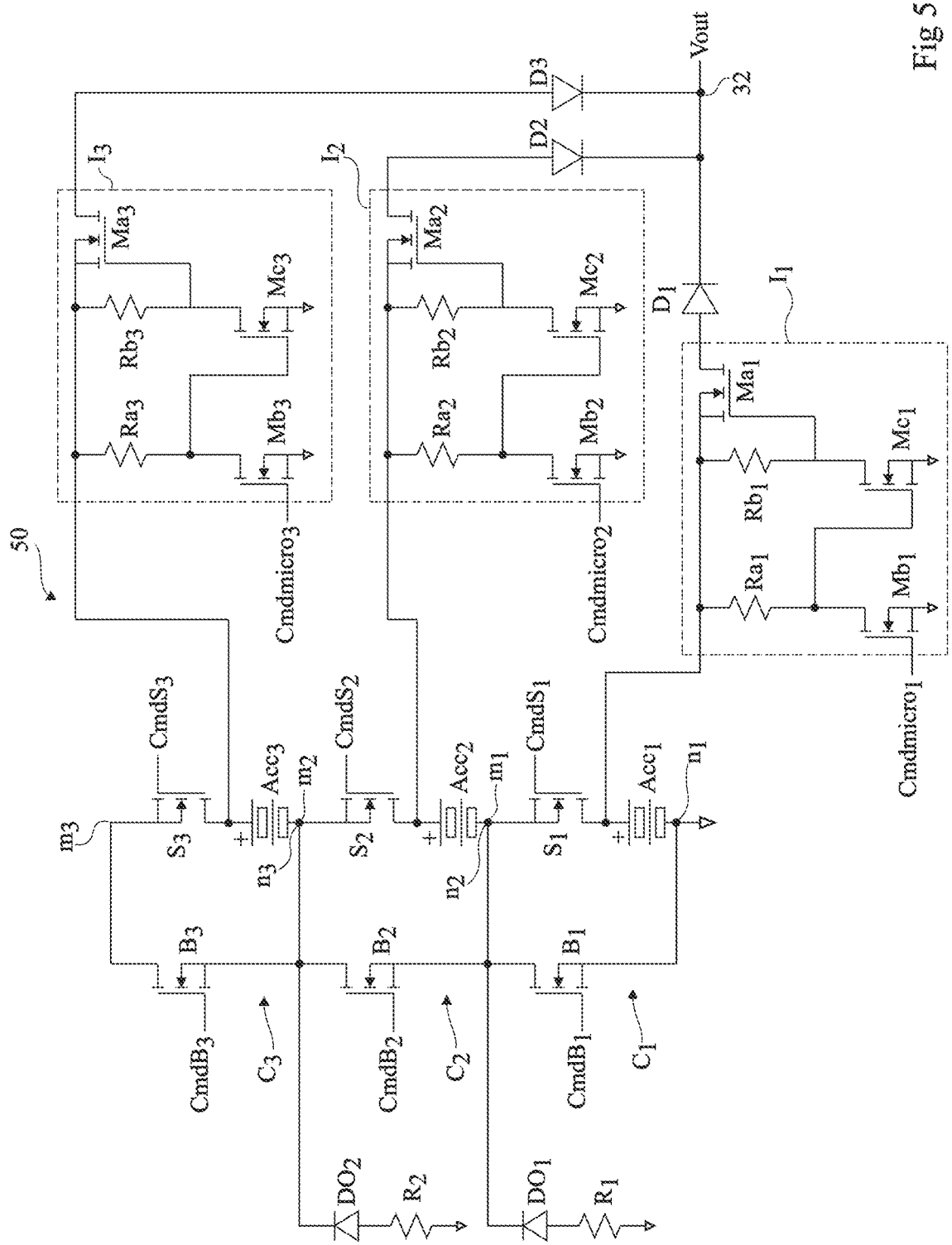

FIG. 5 shows a variant of the embodiment of FIG. 4 where the cathode of accumulator $Acc_i$ is coupled to the anode of diode $D_1$ by a switch $I_1$ having a structure similar to that of the previously-described switches $I_i$.

In the present embodiments, transistors $Ma_i$, $Mb_i$, and $Mc_i$, for i varying from 1 to N, are for example MOS transistors.

The switches $I_i$ described herein are examples of implementation of switches capable of being replaced with other implementations of switches.

An advantage of the embodiment of FIG. 5 is that it is possible to select, at any time, which accumulator powers the control circuit.

Another advantage of the embodiment of FIGS. 4 and 5 is that voltage Vout does not vary according to the switching of the accumulators. Indeed, the voltages present at the input of the block implementing logic function OR only depend on control signals $Cmdmicro_i$, and not on the state of transistors $B_i$ and $S_i$.

An advantage of these embodiments is that they only require a few elementary components to be implemented and are thus relatively inexpensive.

Specific embodiments have been described. Various alterations and modifications will occur to those skilled in the art. In particular, the transistors forming the switches in units may be replaced with other types of switches according to the needs of the circuit.

Various embodiments with different variations have been described hereabove. It should be noted that those skilled in the art may combine various elements of these various embodiments and variations without showing any inventive step.

The invention claimed is:

1. An electric system with switched cells comprising:
a first unit;
a plurality of second units series-connected with the first unit, each first and second unit comprising:
an electric cell series-connected, by the cathode of the cell, with a first switch,
a second switch connected in parallel with the cell and the first switch, and
a first diode, the anode of the first diode being coupled to the cathode of the cell,
the cathodes of the first diodes being connected to an output node, the anode of the cell of the first unit being connected to ground, the anode of the first diode of each second unit being connected to the cathode of the cell of the second unit by at least one third switch;
a first transistor coupling a node of one of the plurality of second units to a first output node;
a second transistor coupling the node of the one of the plurality of second units to a second output node; and
a control circuit configured to be powered by a voltage at the output node, the control circuit capable of measuring characteristics of at least certain cells and of controlling the first, second, and third switches according to the characteristics, wherein:
the cathode of the cell of each second unit is coupled to the anode of the first diode of the second considered unit by as many third switches as there are first and second units located between the second considered unit and the ground; and
the control circuit controls the first transistor and the second transistor such that
when the first transistor is on, the second transistor is off; and
when the second transistor is on, the first transistor is off.

2. The electric system with switched cells according to claim 1, comprising:
a third transistor coupling the first output node to the ground,
a fourth transistor coupling the second output node to the ground, wherein:
the control circuit controls the third transistor and the fourth transistor such that
when the first transistor is on, the fourth transistor is on; and
when the second transistor is on, the third transistor is on.

3. The electric system with switched cells according to claim 1, wherein the first diodes form a block implementing logic function OR.

4. The electric system with switched cells according to claim 1, wherein each of the third switches has the same state, on or off, as one of the second switches.

5. The electric system with switched cells according to claim 1, wherein the states of the third switches are independent from the states of the first and second switches.

6. The electric system with switched cells according to claim 1, wherein:
each second unit further comprises one or more of the at least one third switches depending on the number of second units between the second unit and the first unit, the one or more of the at least one third switches connecting the anode of the first diode of the second unit to the cathode of the cell of the second unit.

7. The electric system with switched cells according to claim 6, wherein for each second unit, the number of third switches equals to the number of second units between the second unit and the first unit plus one.

8. The electric system with switched cells according to claim 6, wherein:
the first diodes form a block implementing logic function OR.

9. The electric system with switched cells according to claim 6, wherein the control circuit is configured to be powered by a voltage at the output node.

10. The electric system with switched cells according to claim 6, wherein each of the third switches has the same state, on or off, as one of the second switches.

11. The electric system with switched cells according to claim 6, wherein the states of the third switches are independent from the states of the first and second switches.

12. The electric system with switched cells according to claim 1, wherein the cathode of the cell of the first unit is coupled to the anode of the first corresponding diode via a fourth switch.

13. The electric system with switched cells according to claim 1, wherein the state of the first switch and the state of the second switch of each first or second unit are opposite.

14. The electric system with switched cells according to claim 1, wherein the anode of the cell of each second unit is connected to the cathode of a second diode, the anode of said second diode being coupled to ground by a resistor.

15. A method for using the electric system according to claim 1, comprising the steps of:
detecting the failure of a cell of a unit among the first unit or one of the second units;
turning on the second switch of said unit and turning off the first switch of said unit; and
turning on at least one third switch of another unit among the first unit or one of the second units.

\* \* \* \* \*